United States Patent
Doglioni Majer

(10) Patent No.: US 7,472,641 B2
(45) Date of Patent: Jan. 6, 2009

(54) MACHINE FOR PREPARING BEVERAGES

(75) Inventor: Luca Doglioni Majer, Como (IT)

(73) Assignee: Rheavendors S.p.A., Caronno Pertusella (VA) (IT)

( * ) Notice: Subject to any disclaimer, the term of this patent is extended or adjusted under 35 U.S.C. 154(b) by 470 days.

(21) Appl. No.: 10/513,739

(22) PCT Filed: May 7, 2003

(86) PCT No.: PCT/IB03/01773

§ 371 (c)(1),
(2), (4) Date: Nov. 26, 2004

(87) PCT Pub. No.: WO03/094681

PCT Pub. Date: Nov. 20, 2003

(65) Prior Publication Data

US 2006/0162569 A1  Jul. 27, 2006

(30) Foreign Application Priority Data

May 9, 2002  (IT) .......................... MI2002A0973

(51) Int. Cl.
*A47J 31/40* (2006.01)
(52) U.S. Cl. .............................. 99/284; 99/290; 99/286; 99/291; 99/289 R

(58) Field of Classification Search .................. 99/284, 99/290, 286, 279, 291, 304, 306, 307, 289 R, 99/302 R
See application file for complete search history.

(56) References Cited

U.S. PATENT DOCUMENTS

| | | | | |
|---|---|---|---|---|
| 2,879,811 | A | * | 3/1959 | Parraga ........................ 141/82 |
| 4,487,337 | A | | 12/1984 | DeJardins |
| 4,728,281 | A | * | 3/1988 | McGuffin et al. ............ 426/433 |
| 4,858,522 | A | * | 8/1989 | Castelli ........................ 99/280 |
| 5,539,856 | A | * | 7/1996 | Andrew et al. ............... 392/467 |
| 5,957,033 | A | * | 9/1999 | In-Albon ...................... 99/284 |
| 6,098,524 | A | * | 8/2000 | Reese ........................... 99/280 |
| 6,517,880 | B2 | * | 2/2003 | Walters et al. ............... 426/433 |

FOREIGN PATENT DOCUMENTS

FR   2631802 A   12/1989

* cited by examiner

*Primary Examiner*—Reginald L Alexander
(74) *Attorney, Agent, or Firm*—Nixon & Vanderhye P.C.

(57) ABSTRACT

A machine for preparing beverages is disclosed, of the type provided with a hollow frame (1) comprising a water feed unit and an assembly for preparing beverages formed of a plurality of components. The components of the assembly are disposed in a compartment closed at the front by a supporting element (5) for at least one mixing chamber (6) and at least one dispensing nozzle (7) and are supported entirely or in part by the supporting element (5). The supporting element is removably mounted with respect to the compartment.

18 Claims, 4 Drawing Sheets

MACHINE FOR PREPARING BEVERAGES

This application is the U.S. National Phase of International Application PCT/IB03/01773, filed on May 7, 2003, which designated the U.S. and claims priority to Italian Application No. IT MI2002A000973, filed May 9, 2002. The entire contents of these applications are incorporated herein by reference.

TECHNICAL FIELD OF THE INVENTION

The present invention relates to the preparation of beverages such as coffee, tea, cappuccino and hot chocolate and in particular to a machine for preparing these beverages.

BACKGROUND OF THE INVENTION

Prior art machines connected to the water mains generally comprise tanks containing soluble products, mixing chambers to mix water with a soluble product or with a mixture of soluble products, dispensing ducts that connect the tanks to the mixing chambers and the latter to the dispensing nozzle, a special unit for espresso coffee, at least one solenoid valve to control delivery of water to the mixing chamber, metering means to meter the exact quantity of soluble product required to obtain a specific beverage and a suction cleaner to clean, after each beverage is dispensed, the dispensing ducts and the mixing chambers from any residue that may deposit.

In prior art machines, the components or parts listed above and others not mentioned, are mounted with the exception of the tanks for soluble products in a specific compartment and, in order to restrict the overall dimensions of the machine, they are placed in close contact with one another or superimposed, making it practically impossible to gain access to a part from the front to perform regular or special maintenance operations without having to remove the superimposed parts and/or some adjacent parts.

Although making it possible to produce a compact dispensing machine, the particular arrangement of the parts inside the machine makes it difficult to access the various parts to perform maintenance operations or to inspect them. In fact, when the dispensing machine is installed in a public place even the smallest adjustment requires disassembly and subsequent reassembly of one or more components or parts, resulting in an increase in working times and hence in directly related costs or requires access from the rear of the machine, which is somewhat impractical.

To solve this problem machines have been supplied equipped with the coffee unit, that is the unit that by grinding the coffee beans and subsequent known operations makes it possible to dispense espresso coffee, provided with runners sliding in specific guides produced on the frame of the machine to allow extraction, as if it were a drawer, of the entire unit with respect to the machine.

However, a machine of this type only allows simple extraction of the coffee unit, without however providing easy access to the remaining parts constituting the machine.

The object of the present invention is to solve the drawbacks of prior art, by providing a machine for distributing beverages obtained from soluble products the structure of which allows, internally, ergonomic distribution of the component parts so that the different parts may be accessed without necessarily having to disassemble the entire machine.

SUMMARY OF THE INVENTION

These objects are attained by the present invention, which relates to a machine for preparing beverages of the type provided with a hollow frame comprising a water feed unit and an assembly for preparing beverages formed of a plurality of components, said components being disposed in a compartment closed at the front by a supporting element for at least one mixing chamber and at least one dispensing nozzle, characterized in that the components of said assembly for preparing beverages are supported entirely or in part by said supporting element and in that said supporting element is removably mounted with respect to said compartment.

An arrangement of this kind allows some components of the assembly for preparing beverages to be supported on the supporting element increasing the free space on the internal walls of the frame. This increases accessibility to those components of the machine directly attached to the fixed walls of the frame.

Moreover, the fact that the supporting element can be removed further facilitates access to those components directly attached to it.

According to an advantageous aspect of the present invention, the supporting element comprises a supporting plate hinged on one of its sides to the hollow frame and designed to rotate between a position in which, together with the fixed elements of the frame, it defines a closed compartment and an overturned position in which it defines an open compartment. The supporting plate mounted to overturn considerably increases the constructional simplicity of the machine and significantly decreases the adjustment times, during inspection, of the machine. In fact, instead of partial disassembly of the machine, a simple manual operation by the operator is all that is required to gain access to any of its components.

According to a preferred aspect of the present invention, the assembly for preparing beverages comprises at least one pump, at least one water volume measuring device, at least one boiler and at least one solenoid valve to control delivery of water to said at least one mixing chamber.

According to another preferred aspect of the present invention, the assembly for preparing beverages also comprises a unit for preparing espresso coffee supported on the supporting plate.

BRIEF DESCRIPTION OF THE DRAWINGS

Further characteristics and advantages of the present invention shall become more apparent from the description hereunder, provided purely as a non-limiting example with reference to the schematic accompanying drawings, in which.

MODES FOR CARRYING OUT THE INVENTION

Figure 1:
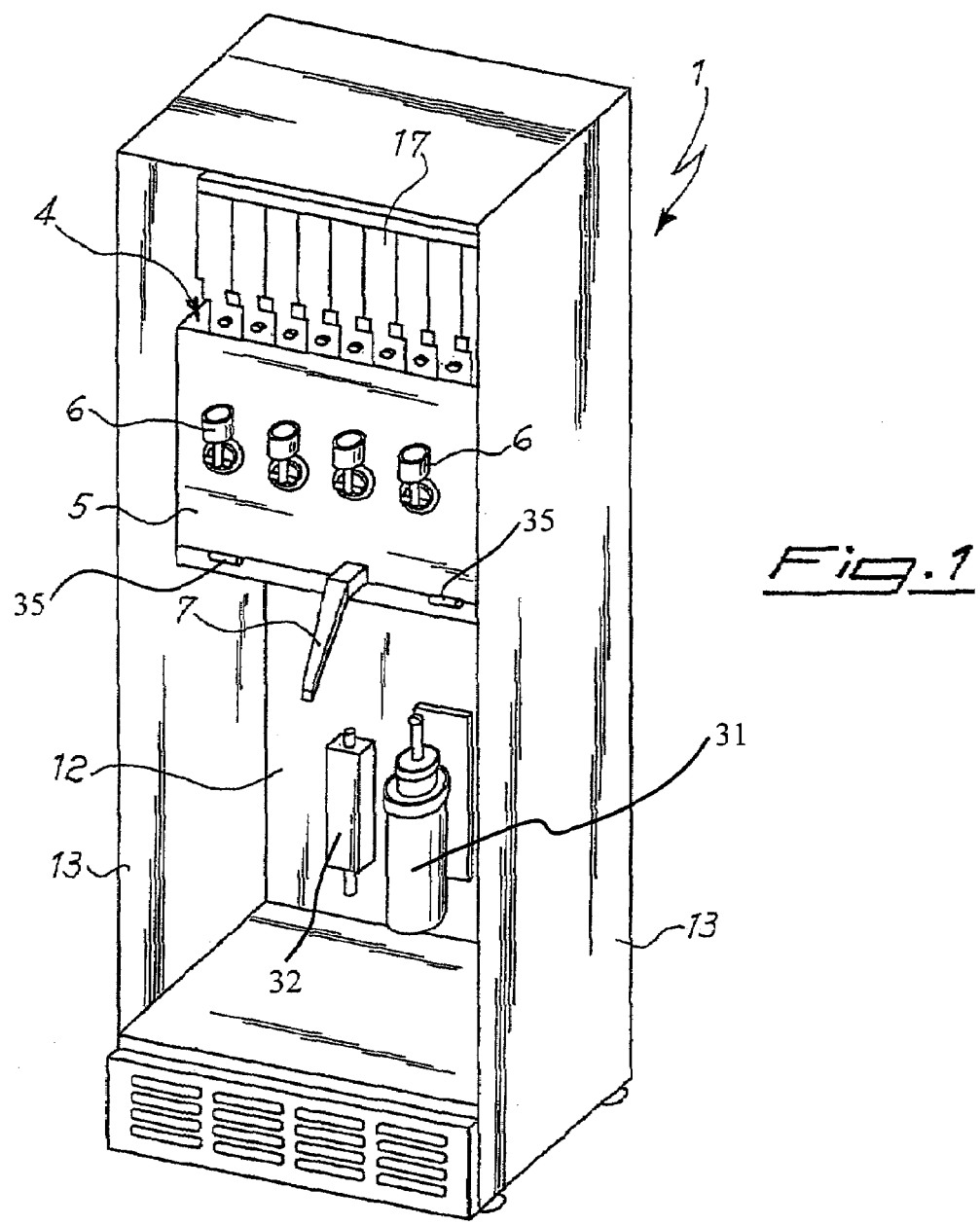
FIG. 1 is an internal perspective view of an embodiment of the beverage dispensing machine according to the present invention with the supporting element in the closed position.

FIG. 1 represents a possible embodiment of a machine for preparing beverages according to the present invention.

In particular, FIG. 1 shows the hollow frame 1 open, that is without the front covering element, of a machine for preparing beverages according to the present invention.

The hollow frame 1 comprises, in a known way, a water feed unit 8 and an assembly for preparing beverages formed of a plurality of components contained in a specific compartment 4, closed at the front, as shown in FIG. 1, by a supporting element 5 for the mixing chambers 6 and the dispensing nozzle 7.

The water feed unit 8 connected to the water mains is constituted by a solenoid valve to control the delivery of water to the system and by a water level control unit 38 that guarantees a minimum level of water in the system. While the elements constituting the water feed unit 8 are attached to the internal walls of the hollow frame 1, the elements constituting the assembly for preparing beverages are fixed to the supporting element 5. The supporting element 5 is constituted by a supporting plate removably mounted with respect to the compartment 4 of the frame.

In other words, the supporting plate 5 may be detached from the compartment 4 of the frame to be removed.

The supporting plate 5 is connected to the frame 1 by means constituting a hinge to allow it to rotate with respect to one side of the same as if it were a flap. The means constituting the hinges 35 around which the plate 5 rotates may be represented, for example, by pins disposed on one side of the plate 5 and engaged, in a removable way, in specific circular seats (not shown) made on the frame 1 or by other known means. In the embodiment shown in FIG. 2, the supporting plate 5 hinged on the bottom side rotates downward with respect to it, although, without departing from the scope of protection of the present invention, it is also possible to provide hinging means that allow upward rotation, that is hinging means that allow the supporting plate to rotate with respect to its top side.

Figure 2:
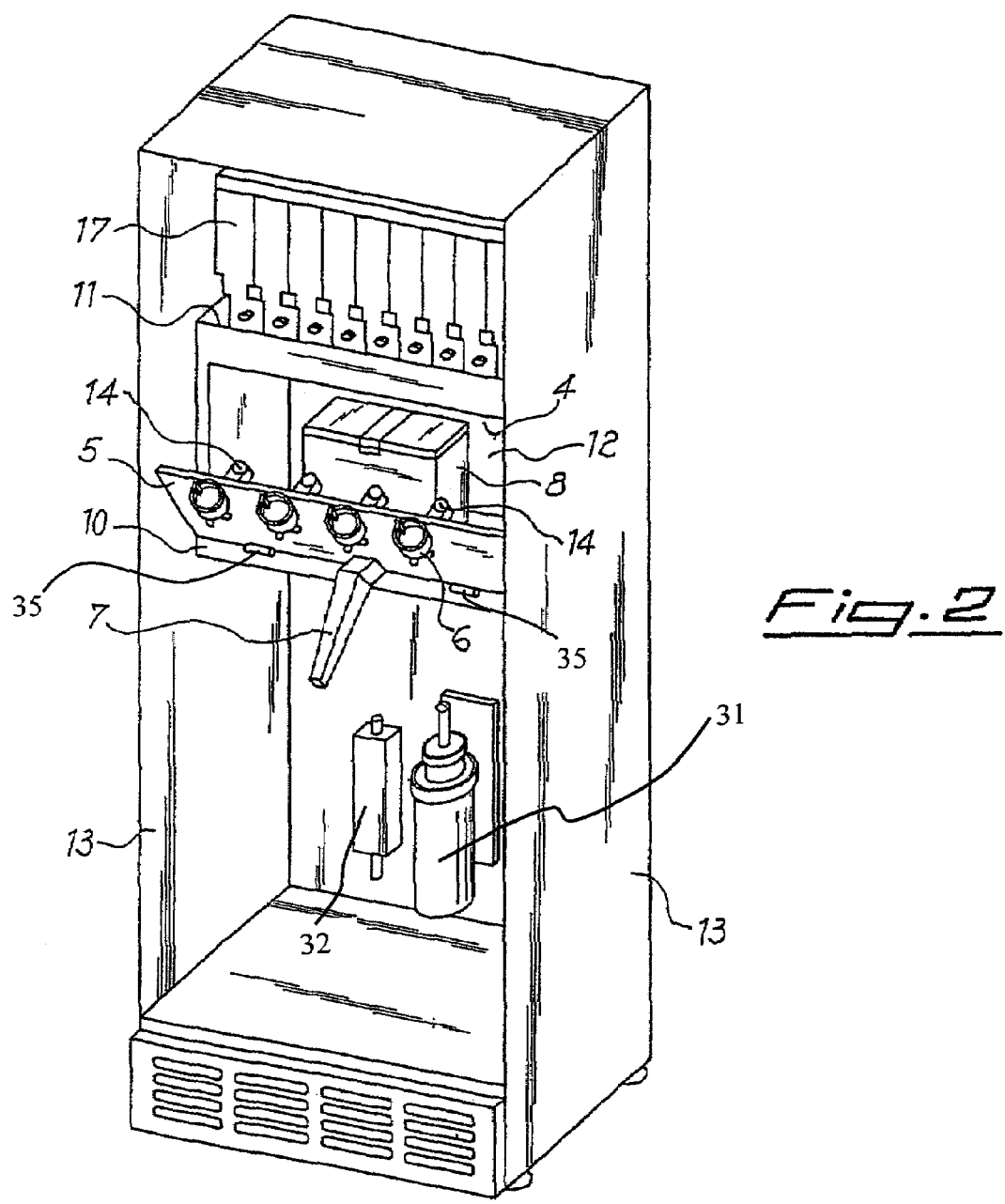
FIG. 2 is an internal perspective view of an embodiment of the beverage dispensing machine according to the present invention with the supporting element in the open or overturned position.

In detail, the supporting plate 5 can rotate between a position in which in combination with other fixed elements of the frame 1 it constitutes a closed compartment 4, as shown in FIG. 1, to contain components of the assembly for preparing beverages and a position in which it defines an open compartment 4 as shown in FIG. 2.

The fixed elements of the frame designed to define the containing compartment 4 are represented by two fixed plates 10, 11 disposed crosswise with respect to the frame 1, one top and one bottom, and by the rear 12 and side 13 walls of the same frame.

In the embodiment shown in FIGS. 1 and 2 the assembly for preparing beverages is constituted by a pump 31 controlled by a water volume measuring device 32 designed to meter the quantity of water required to prepare a particular beverage, from a boiler 33 responsible for heating the water and by a solenoid valve 14 for each mixing chamber 6. All the components of the assembly, that is the boiler, the solenoid valves 14 and the pump, are supported on the supporting plate 5 and therefore simply by rotating this plate they become accessible to an operator entrusted with their maintenance or adjustment. Alternatively, without departing from the scope of protection of the present invention, it is possible to only partly fix the components of the assembly for preparing beverages to the supporting plate 5. In other words, it is possible to fix only some of the components of the assembly, such as the solenoid valves and the boiler, to the plate 5 and the remaining components to a side wall of the frame 1.

The assembly for preparing beverages is connected in a known way, via ducts not shown, to the storage tanks 17 of the soluble products which, as shown in FIG. 2, are disposed at the top end of the frame 1 and are fastened to it.

The mixing chambers 6 may also be equipped with one or more specific blenders 36 to facilitate mixing the soluble product with the water.

As mentioned previously, the supporting plate 5 may be detached from the compartment 4 of the frame. For this purpose, for example according to an alternative embodiment, the supporting plate 5 may be provided with two side guides designed to slide in specific tracks disposed on the internal frame 1 of the machine to make its extraction possible, as if it were a drawer, with respect to the compartment 4.

Figure 3:
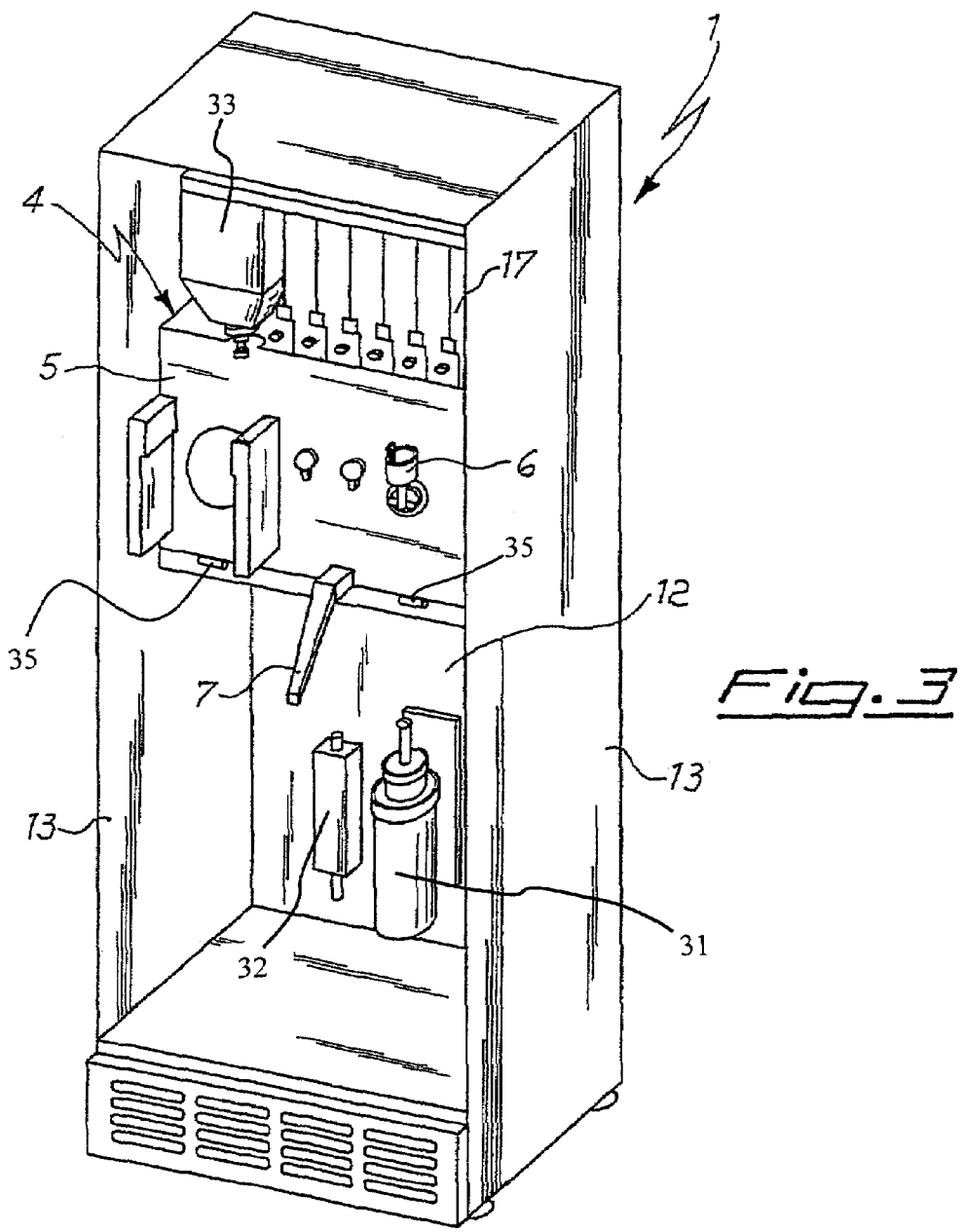
FIG. 3 is an internal perspective view of an alternative embodiment of the beverage dispensing machine according to the present invention with the supporting element in the closed position.
Figure 4:
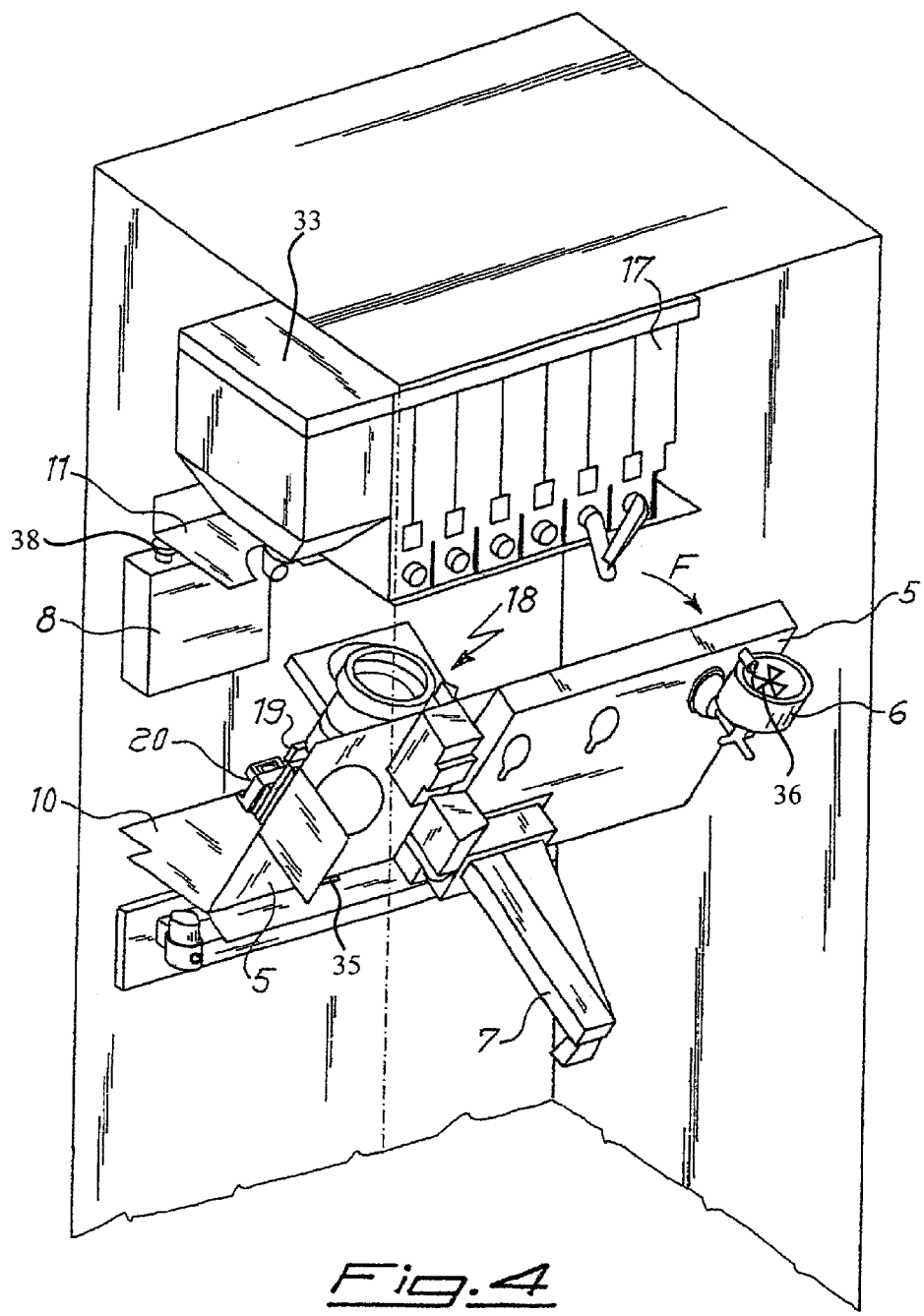
FIG. 4 is a perspective view of the embodiment in FIG. 2 with the supporting element in the open position.

FIGS. 3 and 4 shows an alternative embodiment of the machine according to the present invention and in particular a machine in which the assembly for preparing beverages, in addition to the components listed above, also comprises another unit 18 for preparing espresso coffee. As well as preparing beverages from soluble products, an embodiment of this kind also allows espresso coffee to be made. The unit 18 for preparing espresso coffee, as shown in FIG. 4, is equipped with a grinder 19 operated by an electric motor 20 to grind the coffee beans and is supported, as shown in FIG. 4, on the supporting plate 5.

Therefore, also in this embodiment all the components for preparing beverages are supported on the supporting plate 5 designed to rotate around one of its sides. As previously illustrated, rotation of the supporting plate, indicated in FIG. 4 by the arrow F, allows an operator entrusted with their maintenance to access all the components. It is also possible to detach the plate 5 from the hollow frame 1, after disconnecting some ducts, not shown, to gain access to the components of the assembly for preparing beverages or to the components of the water feed unit mounted fixed on the walls of the hollow frame 1.

The machines for preparing beverages illustrated above also have all the parts, such as connection pipes and safety valves, not specifically mentioned in this description, that are normally found in similar machines.

Various modifications may be made without departing from the scope of the present invention. For example, the supporting element or plate 5 may be made of two adjacent plates hinged separately to the hollow frame 5. In this case, one plate will support, for example, the coffee unit 18 and one plate will support all or part of the remaining components of the assembly for preparing beverages.

The invention claimed is:

1. A machine for preparing beverages, provided with a hollow frame comprising a water feed unit and an assembly for preparing beverages formed of a plurality of components, said components being disposed in a compartment closed at the front by a supporting element for at least one mixing chamber, wherein the components of said assembly for preparing beverages are supported entirely or in part by said supporting element and said supporting element is removably mounted with respect to said compartment, and wherein said supporting element is positioned within the confines of the hollow frame as an internal component of the machine, said supporting element comprising a supporting plate hinged at one of its sides to the hollow frame and designed to rotate between a position in which, in combination with fixed elements of said frame, it defines a closed compartment and an overturned position in which it defines an open compartment.

2. A dispensing machine as claimed in claim 1, wherein said assembly for preparing beverages comprises at least one pump, at least one water volume measuring device, at least one boiler and at least one solenoid valve to control delivery of water to said at least one mixing chamber.

3. A dispensing machine as claimed in claim 2, wherein said assembly for preparing beverages also comprises a unit for preparing espresso coffee supported on the supporting plate.

4. A dispensing machine as claimed in claim 1, wherein said water feed unit comprises at least a grinder to prepare espresso coffee.

5. A dispensing machine as claimed in claim 1, wherein said mixing chamber comprises a blender.

6. A dispensing machine as claimed in claim 1, wherein said water feed unit is connectable to a water supply and comprises a solenoid valve to control the delivery of water to the system and a water level control unit.

7. A dispensing machine as claimed in claim 1, wherein said water feed unit is mounted fixed on the side walls of said hollow frame.

8. A dispensing machine as claimed in claim 1, wherein said unit for preparing beverages is connected to at least one tank for the soluble product.

9. A dispensing machine as claimed in claim 1, further comprising a front covering element provided to the frame, the supporting element being positioned inside the front covering element.

10. A machine for preparing beverages, provided with a hollow frame comprising a water feed unit and an assembly for preparing beverages formed of a plurality of components, said components being disposed in a compartment closed at the front by a supporting element for at least one mixing chamber, wherein the components of said assembly for preparing beverages are supported entirely or in part by said supporting element, and wherein said supporting element comprises a supporting plate movable between a closed position in which, in combination with fixed elements of said frame, the compartment is closed, and an open position in which the compartment is open, said supporting element defining an inner surface oriented towards the compartment and an outer surface opposite the inner surface, each of inner and outer surfaces supporting one or more of said components.

11. A machine as claimed in claim 10, further comprising at least one pump, at least one water volume measuring device, at least one boiler and at least one solenoid valve to control delivery of water to said at least one mixing chamber.

12. A machine as claimed in claim 10, further comprising a unit for preparing espresso coffee supported on the supporting plate.

13. A machine as claimed in claim 10, wherein said water feed unit comprises at least a grinder to prepare espresso coffee.

14. A machine as claimed in claim 10, wherein said mixing chamber comprises a blender.

15. A machine as claimed in claim 10, wherein said water feed unit is connectable to a water supply and comprises a solenoid valve to control the delivery of water to the system and a water level control unit.

16. A machine as claimed in claim 10, wherein said water feed unit is mounted on a side wall of said hollow frame.

17. A machine as claimed in claim 10, wherein said unit is connected to at least one tank to contain a soluble product.

18. A machine as claimed in claim 10, wherein the supporting plate is hingedly attached to a side of the hollow frame.

\* \* \* \* \*